United States Patent [19]

Radel

[11] Patent Number: 4,968,502

[45] Date of Patent: Nov. 6, 1990

[54] REMOVAL OF SULFIDES FROM GAS STREAMS WITH LOW-COST CATALYST

[75] Inventor: Robert J. Radel, Florence, Ala.

[73] Assignee: Tennessee Valley Authority, Muscle Shoals, Ala.

[21] Appl. No.: 322,452

[22] Filed: Mar. 13, 1989

[51] Int. Cl.$^5$ .................. C01B 17/6; C01B 31/20; B01J 8/00; C07C 11/24

[52] U.S. Cl. .................. 423/224; 423/225; 423/230; 423/244; 423/245.1; 423/576.8

[58] Field of Search .......... 423/244 R, 244 A, 245.1, 423/245.2, 224, 225, 230, 576.8

[56] References Cited

U.S. PATENT DOCUMENTS

| | | | |
|---|---|---|---|
| 1,335,348 | 3/1920 | Patrick et al. | 423/230 |
| 1,895,724 | 1/1933 | Miller et al. | 423/244 |
| 2,083,894 | 6/1937 | Connolly | 423/224 |
| 4,314,977 | 2/1982 | Kulik | 423/576.8 |

OTHER PUBLICATIONS

Pierce, J. A., J. Phys. Chemical, 1929, 33, 22–36.

Primary Examiner—Gregory A. Heller
Attorney, Agent, or Firm—Robert A. Petrusek

[57] ABSTRACT

The invention described herein discloses the use of silica gel as a catalyst for the efficient oxidation of hydrogen sulfide to elemental sulfur by nitric oxide. Concomitantly, this catalyst also promotes the hydrolysis of carbonyl sulfide to carbon dioxide and hydrogen sulfide, which then can be oxidized further by nitric oxide in the same reactor to produce elemental a sulfur. This process is designed for application in coal combustion and coal-gasification processes as a replacement for the presently available and practiced expensive methods and means for gas purification and catalytic liquid-phase conversion of these gases to sulfur. A principal advantageous feature of the instant invention is the fact that practice thereof alleviates or removes the heretofore restrictions and impediments imposed on such or similar techniques of the prior art in that the sulfur-containing pollutants from many gas stream efluents such as, for example, those emitted by the combustion of high-sulfur content fossil fuel comprising coal and/or oil, can be effectively and efficiently treated, without the need or requirement to substantially adjust or change the enthalpy of such gas stream, to thereby effect the desired cleaning treatment thereof.

6 Claims, 3 Drawing Sheets

REMOVAL OF SULFIDES FROM GAS STREAMS WITH LOW-COST CATALYST

The invention herein described may be manufactured and used by or for the Government for governmental purposes without the payment to me of any royalty therefor.

INTRODUCTION

The present invention relates to the general area of removing sulfur-containing pollutants from gas stream effluents, and more particularly effluents of the kind effected by the combustion of fossil fuels including high-sulfur coals. In recent years, there has been increasing concern directed to developing and/or implementing methods and means which will prove to be effective for the preservation of a clean environment, including an environment free from a variety of sulfides of the type normally emitted from the burning of high-sulfur coals. Accordingly, intensive research efforts on a variety of processes for removing or reducing such emissions from chemical process streams including hot gas desulfurization processes have been pursued. At the present time, practice of technology directed to the state of the art relating to removing sulfur from coal, either before or after the stage of combustion thereof, is quite expensive. Accordingly, there is a great need for development of inexpensive sulfur removal technology which could greatly increase the use of high-sulfur content coals which are rapidly becoming the substantiating factors of coal reserves which remain available and can be readily and economically mined. Of course, the development of such technology would also be useful for removing sulfur compounds from other industrial gas stream effluents such as sour gas.

These environmental concerns require that such sulfur removal technologies be applied either at the front end of the burning or oxidation operation or at the back end or downstream side of coal combustion or coal gasification processes that use such high-sulfur content coal. Such front end technology is normally applied at the coal cleaning operation, but is fraught with several disadvantages and shortcomings since it is known that although coal cleaning operations may be effective in removing pyritic sulfur, they are less effective in removing organic sulfur. Additionally, residues resulting from presently available state of the art coal cleaning operations often present potentially severe problems through leaching of sulfuric acids from the piles of such accumulated residue.

It is also well known and appreciated by those skilled in this art that the nature of the coal gasification process lends itself to effecting efficient sulfur removal downstream of the gasifier, thus decreasing total sulfur emissions from power generation facilities driven by the energy of fossil fuels. Congeneric sulfur compounds and small quantities of nitrogen derived from the coal are converted to their reduced forms in the reducing atmosphere existing in the gasifiers. Such sulfur is present as $H_2S$ and COS, with trace quantities of other reduced forms. It is normal and common practice in this art to subsequently feed the output of the gasifier to a gas cleaning process to thereby effect the removal of these gases. The removal of these sulfur compounds is in a highly concentrated stream, which stream is subsequently sent to a sulfur recovery unit, i.e., ordinarily a Claus unit with attendant Claus tail-gas cleanup system.

In the Claus unit, the $H_2S$ and $SO_2$ ($SO_2$ from combustion of sulfur or $H_2S$) are reacted in a catalytic unit to form elemental sulfur. The sulfur is subsequently condensed from the hot gas and recovered as molten elemental sulfur. Other processes such as the Holmes-Stretford and the Lo-Cat processes are available to convert $H_2S$ to elemental sulfur. A review of these processes can be found in the *Kirk-Othmer Encylopedia of Chemical Technology*, Volume 22, pages 267-297, John Wiley and Sons, New York, 1983. These processes, however, are normally limitied to (1) situations wherein the sulfur compounds are of relatively low concentrations or (2) production facilities handling relatively small quantities of sulfur (less than about 10 tons per day).

All of the above referenced processed require the use of a gas purification unit to effectively absorb and remove sulfur compounds from the product gas stream. Subsequently, the resulting enriched off-gases which are recovered from the purification unit then must be sent to a separate sulfur recovery system. Both the absorber and the sulfur recovery units represent large capital expenditures and exhibit inherently high operating and maintenance costs.

BACKGROUND OF THE INVENTION

1. Field of the Invention

The present invention relates to the broad field of sour gas/sulfur gas removal from coal combustion, coal gasification, or other product gas streams containing sulfur-laden pollutants. Process gas stream desulfurization, as it related to the present invention, generally means the removal of $H_2S$ and/or COS from the process gas stream in a single step. The present invention teaches a process for the simultaneous removal of COS and $H_2S$ from process gas streams by the reaction of such carbonyl sulfide with water vapor (to convert the COS to both $CO_2$ and $H_2S$) and/or nitric oxide (to convert the $H_2S$ to elemental sulfur) over a silica gel catalyst in a single reactor.

2. Description of the Prior Art

With the increased concern expressed, beginning in about the early 1970s, by various walks of life including the academia and the general public relating to the deleterious effects of air pollution came a paucity of research aimed at removing sulfur and nitrogen oxides from various emissions sources. Generally, treatment of these emissions can be placed in two categories: (a) those processes which selectively remove sulfur gases for purification and (b) those processes which convert these sulfur gases to elemental sulfur. Although many of these processes appear to have been adequately reviewed in the *Kirk-Othmer Encyclopedia of Chemical Technology*, Volume 22, pages 267-297, John Wiley and Sons, New York, 1983; brief discussion of some of the more salient points found in this literature is discussed below for the convenience of the reader.

The first category of processes, supra, normally utilizes an absorbent to remove the sulfur gases from the process gas stream. The resulting absorbent sulfur gas complex is subsequently treated, usually by simple heating, with oxygen or water to regenerate the absorbent and to recover a relatively purified sulfur gas. The absorbent in these processes can be either a solid metal or metal oxide either alone or on an inert support, or it can be containing an organic or inorganic absorbent with such solutions being aqueous- or nonaqueous-based. In reviewing the pertinent prior art, over 87 references were located which discussed minor improvements or changes in many of these processes. For the sake of brevity, only few of the more recent, representative, and pertinent of this plethora of prior art teachings are discussed below.

In 1987, the Electric Power Research Institute (EPRI) published findings of an investigation by Mittelhauser Corporation (G. E. Pack and G. L. Walter, *Investigation of Sulfur Removal From Low-Pressure Gas*, EPRI-AP-5102, April 1987) which compared six commercial processes for removing COS and $H_2S$ from hot gases. These six processes were the Stretford, Shafer, Unisulf, Sulfolin, Lo-Cat, and Hiperion processes. All of these processes involve a liquid phase oxidation of the sulfur gases to elemental sulfur. Additionally, all of these processes require some form of gas purification or separation step prior to the oxidation step thereof. None of these six processes appeared superior for all sulfur gas removal operations, although the Lo-Cat process was selected as being better than the other five when utilized for gases containing low concentrations of sulfur gases.

The remaining literature references, supra, can be divided into the following groupings:
1. Processes using solid adsorbents.
   a. Processes using metal oxides/metals with or without supports.
   b. Processes using zeolites.
2. Processes using liquid absorbents.
   a. Processes using organic absorbents.
   b. Processes using aqueous inorganic absorbents.
3. Processes in which the gases are reacted directly using a solid catalyst.

Processes using solid absorbents generally involve metals or metal oxides either alone, or on the surface of a silica or alumina support. For example, Denny and Wood (Eur. Pat. Appl. EP No. 243052, Oct. 28, 1987) use a bed of copper, zinc, or aluminum oxides for effectively removing sulfur compounds from natural gas under nonreducing atmospheres. E. Quemere uses zirconium or cerium with titanium supported on silica (EP No. 244310, Nov. 4, 1987) to remove sulfur gases from industrial waste gases. Nickel (BE No. 905986, Jun. 19, 1987), iron (Jpn. Kokai Tokkyo Koho JP No. 62/1436 A2, Jan. 7, 1987), and other metals are also used as supported or unsupported absorbents.

Sodium-calcium or sodium-A zeolites and molecular sieves are also used as absorbents (W. Lutz, M. Buelow, F. Zobel, and B. Kursmann, DD No. 242351, Jan. 28, 1987) for carbon dioxide contaminated with hydrogen sulfide.

Processes which use liquid absorbents generally use some type of organic amine which is regenerated in a second step, although other organics are also reported to be effective. For example, Dow Chemical Company has patented a process (Jpn. Kokai Tokkyo JP No. 62/106987, May 18, 1987) which uses alkanolamines such as methydietanolamine in an aqueous alkaline solution to remove COS, $H_2S$, $CO_2$, and mercaptans from light hydrocarbons. Other processes use an aqueous inorganic base such as $K_2CO_3$ [R. W. Rousseau, J. K. Ferrel, and J. S. Staton, *Energy Prog.* 7(1), 1–8] to remove COS and $H_2S$ from coal gases.

In U.S. Pat. No. 4,314,977, Kulik, Feb. 9, 1982, there is described a process for the removal of either $H_2S$ or NO from effluent gases. The procedure described therein requires a mole ratio $H_2S$:NO ranging from about 0.5:1 to about 1.1:1 and the addition of oxygen thereto such that the resulting oxygen concentration is greater than about one-half mole of oxygen per mole of NO. Under the above conditions either NO or $H_2S$ can be removed completely from the gas stream. Although no clear-cut mechanism was suggested, the following two reactions are postulated as occurring:

$$H_2S + 2NO \rightarrow N_2O + S + H_2O \qquad (1)$$

$$2H_2S + 2NO + O_2 \rightarrow N_2 + S + 2H_2O \qquad (2)$$

References to processes in which the gases are directly reacted with a catalyst for conversion to alternate products also exist in the literature. For an example, a solid catalyst system has been patented by Klaus Storp and Emil Ruhi (Ger. Offen. DE No. 3535815 Al, Apr. 9, 1987) in which $H_2S$ and $SO_2$ are reacted with oxygen over a catalyst consisting of nickel impregnated alumina or titanium dioxide.

There has been some early work in which silica gel was used as a catalyst. In these early experiments, much lower conversions of the gases to sulfur were experienced than in the instant invention. This early work is discussed in greater detail below.

Early work by Pierce (Pierce, J. A., *J. Phys. Chem.* 1929, 33, 22–36) described the oxidation of hydrogen sulfide to elemental sulfur by nitric oxide in a glass reactor at low temperatures (28°–100° C.) and about 1 atm pressure over silica gel, glass wool, and ferric oxide-impregnated silica gel catalysts. Pierce suggested the mechanism given in equations 3 and 4, infra, in which two molecules of nitric oxide associate to form catalyst-adsorbed $N_2O_2$, which $N_2O_2$ serves as the actual oxidant for $H_2S$:

$$2NO \rightarrow N_2O_2 \qquad (3)$$

$$N_2O_2 + 2H_2S \rightarrow N_2 + 2H_2O + 2S \qquad (4)$$

Pierce attributed a negative temperature effect to a decrease in the association of NO to $N_2O_2$ at higher temperatures. In addition, he reported that blinding of the catalyst occurred by colloidal sulfur, resulting in an inhibitory effect.

SUMMARY OF THE INVENTION

It now has been discovered that COS and $H_2S$ can be essentially completely converted to elemental sulfur at temperatures substantially above 100° C. using water and/or nitric oxide and a silica gel catalyst. This is in contrast to the teachings of the prior art which would lead those skilled in this art to believe that the reaction will be less favorable at higher temperatures. In addition, by conducting the reaction at these elevated temperatures, the sulfur is essentially removed from the catalyst surface, thus avoiding the problems heretofore associated with colloidal sulfur buildup on the catalyst, as referenced by Pierce, supra. These teachings provide for a process which is eminently suitable for the removal of COS or $H_2S$ from process gas or waste gas streams at the operating temperatures of such gas streams and at efficiency levels ranging upward to about 99 percent. Consequently, the instant process alleviates or removes the heretofore restrictions and impediments imposed on such or similar techniques of the prior art in that the sulfur-containing pollutants from many gas stream effluents such as, for example, those emitted by the combustion of high-sulfur content fossil fuel comprising coal and/or oil, can be effectively and efficiently treated, without the need or requirement to substantially adjust or change the enthalpy of such gas stream, to effect the desired cleaning treatment thereof.

OBJECTS OF THE INVENTION

It is therefore a principal object of the present invention to provide a process for the removal of COS and $H_2S$ from process gas or waste gas streams by converting these gases to elemental sulfur virtually completely through the use of a low-cost catalyst (silica gel), water, nitric oxide, and at temperatures in a range such that the enthalpy of such process gas stream will not have to be significantly adjusted or changed to accommodate the practice thereof.

Another object of the present invention is to provide a process for the removal of COS and $H_2S$ from process gas or waste gas streams by converting these gases to elemental sulfur virtually completely through the use of a low-cost catalyst (silica gel), water, nitric oxide, and at temperatures in a range such that the enthalpy of such process gas stream will not have to be significantly adjusted or changed to accommodate the practice thereof to thereby retain the potential thermal energy of said process gas stream; and, wherein no separate gas absorber is needed or required in gasifier means attendant said process.

A further object of the present invention is to provide a process for the removal of COS and $H_2S$ from process gas or waste gas streams by converting these gases to elemental sulfur virtually completely through the use of a low-cost catalyst (silica gel), water, nitric oxide, and at temperatures in a range such that the enthalpy of such process gas stream will not have to be significantly adjusted or changed to accommodate the practice thereof to thereby retain the potential thermal energy of said process gas stream; wherein no separate gas absorber is needed or required in gasifier means attendant said process; and further, wherein processes are available for the conversion of the sulfur-laden pollutants in such process gas stream to be converted to the desired form of elemental sulfur within said process gas stream and under the relatively high pressures maintained thereon to effectively retain the kinetic energy of the flowing gas in said gas steam whereby same may be captured and utilized as, for example, in a downstream gas turbine.

A still further object of the present invention is to provide a process for the removal of COS and $H_2S$ from process gas or waste gas streams by converting these gases to elemental sulfur virtually completely through the use of a low-cost catalyst (silica gel), water, nitric oxide, and at temperatures in a range such that the enthalpy of such process gas stream will not have to be significantly adjusted or changed to accommodate the practice thereof to thereby retain the potential thermal energy of said process gas stream; wherein no separate gas absorber is needed or required in gasifier means attendant said process; wherein processes are available for the conversion of the sulfur-laden pollutants in such process gas stream to be converted to the desired form of elemental sulfur within said process gas stream and under the relatively high pressures maintained thereon to effectively retain the kinetic energy of the flowing gas in said gas stream whereby same may be captured and utilized as, for example, in a downstream gas turbine; and still further, wherein said process operates without the requirement of the utilization therein of potentially hazardous materials including pollutants that would otherwise require environmentally related considerations for the disposal thereof.

Still another object of the present invention is to provide a process for the removal of COS and $H_2S$ from process gas or waste gas streams by converting these gases to elemental sulfur virtually completely through the use of a low-cost catalyst (silica gel), water, nitric oxide, and at temperatures in a range such that the enthalpy of such process gas stream will not have to be significantly adjusted or changed to accommodate the practice thereof to thereby retain the potential thermal energy of said process gas stream; wherein no separate gas absorber is needed or required in gasifier means attendant said process; wherein processes are available for the conversion of the sulfur-laden pollutants in such process gas stream to be converted to the desired form of elemental sulfur within said process gas stream and under the relatively highly pressures maintained thereon to effectively retain the kinetic energy of the flowing gas in said gas stream whereby same may be captured and utilized as, for example, in a downstream gas turbine; wherein said process operates without the requirement of the utilization therein of potentially hazardous materials including pollutants that would otherwise require environmentally related considerations for the disposal thereof; and even still further, wherein the catalytic agent utilized therein for attaining the desired objectives thereof is readily available, of relatively low cost and therefore economically attractive, and of sound environmental virtue characterized by it being nonhazardous to animate or inanimate objects.

Another and further object of the present invention is to provide a process for the removal of COS and $H_2S$ from process gas or waste gas streams by converting these gases to elemental sulfur virtually completely through the use of a low-cost catalyst (silica gel), water, nitric oxide, and at temperatures in a rnage such that the enthalpy of such process gas stream will not have to be significantly adjusted or changed to accommodate the practice thereof to thereby retain the potential thermal energy of said process gas stream; wherein no separate gas absorber is needed or required in gasifier means attendant said process; wherein processes are available for the conversion of the sulfur-laden pollutants is such process gas stream to be converted to the desired form of elemental sulfur within said process gas stream and under the relatively high pressure maintained thereon to effectively retain the kinetic energy of the flowing gas in said gas stream whereby same may be captured and utilized as, for example, in a downstream gas turbine; wherein said process operates without the requirement of the utilization therein of potentially hazardous materials including pollutants that would otherwise require environmentally related considerations for the disposal thereof; wherein the catalytic agent utilized therein for attaining the desired objectives thereof is readily available, of relatively low cost and therefore economically attractive, and of sound environmental virtue characterized by it being nonhazardous to animate or inanimate objects; and still even further, wherein the requirements of capital investments are substantially reduced because the requirements for attendant equipment are minimized while at the same time providing materials and means heretofore unavailable for use in conjunction with relatively large-scale gasifying equipment.

DESCRIPTION OF THE DRAWINGS

The present invention, together with further objects and advantages thereof, will be better understood from a consideration of the following description taken in connection with the accompanying drawings in which:

FIG. 1 is a generalized representation of the laboratory apparatus used in conducting the experiments used for gathering the data herein. As may be seen, the reacting gases were regulated by the use of a bank of flow meters connected between the source bottles, the water addition system, and the gas chromatography (GC) analysis system. The gases were passed through the quartz reaction tube which contained as a catalyst, a bed of high-purity, high-surface area silica gel. As is further shown, the quartz reaction tube was suspended vertically in a Lindgerg three-zone tube type furnace. Products were collected in an ice-cooled trap connected to the bottom of the quartz reactor.

For the sake of clarity and ease of understanding by the reader, FIGS. 2 and 3 are discussed in greater detail below under the heading for Examples X-XXIX.

DESCRIPTION OF THE PREFERRED EMBODIMENTS

The present invention relates to a process which effectively removes COS and $H_2S$ from concentrated process gas streams at efficiency level ranging upwards to about 99 percent. My earliest laboratory work was initially centered on the gas-phase production of thiourea from such materials as CO, NO, and $H_2S$. During the preliminary experiments in which $H_2S$ and NO were both present, I obtained results similar to those of Pierce (Pierce, J. A., *J. Phys. Chem.* 1929, 33, 22-36), but unexpectedly with much greater yields. The results obtained from this early work were indeed unexpected because of the resulting relatively higher temperatures at which my experiments were effected as compared to temperatures which were anticipated in light of the apparent negative temperature effect reported by Pierce.

As discussed above, the initial thrust of my early work was in a direction toward the development of a synthetic process for the production of thiourea from carbon monoxide, nitric oxide, and hydrogen sulfide. The laboratory equipment and arrangement thereof which was used in these early tests was similar to that disclosed by pierce, supra. Accordingly, for purposes of teaching, disclosing, and claiming the instants invention, the teachings and disclosure of the above *Journal of Physical Chemistry* reference are herewith and hereby incorporated herein by reference thereto. More specific details of the equipment employed and the various operating parameters proved are given in greater detail in various of the examples, infra. Accordingly, in one of my first tests, silica gel was charged to a quartz tube reactor and the system brought to a temperature in the range of from about 200° C. to about 300° C., whereupon carbon monoxide, nitric oxide, and hydrogen sulfide were passed over the silica gel which was to soon prove its ability to function as a superior catalyst, it being understood that there are a variety of silica gel materials, which are readily available and marketed at economically attractive prices as catalysts. The particular silica gel catalyst utilized in many of my tests was a high surface area catalyst grade silica gel marketed by Strem Chemicals. X-ray analysis confirmed that the yellow solid material which was subsequently collected from the trap and lower reaction tube was elemental sulfur. The total gas flow rate utilized in this early test was maintained in the range from about 2.5 liters per hour to about 3.0 liters per hour. After confirmation of the results in said early test, supra, it was decided to run comparative tests in which no silica gel catalyst was employed. In these follow up comparison tests, traces of solid material were formed on the lower reaction tube; however, there were insufficient amounts of the material which was collected to be identified. Based in part on these observations, it was concluded that the method taught in '977, Kulik supra, is not sufficient for the complete removal of sulfur gases. In still another test in which the silica gel catalyst loading was increased and the temperature and gas flow rates were held at the levels used in the first tests, supra. A substantial amount of yellow solid material was obtained from the trap and the lower reaction tube. This solid material was also identified as elemental sulfur. Accordingly, further tests were run to determine if the carbon monoxide, or the nitric oxide, or both were necessary to cause the observed oxidation of hydrogen sulfide to elemental sulfur. In the first experiment of this particular set of tests, carbon monoxide and hydrogen sulfide were passed over silica gel, intended as the catalyst. No solid product was obtained in the trap or the lower reaction tube. In the second experiment of this set of tests, nitric oxide and hydrogen sulfide were passed over such silica gel catalyst. Again, a yellow solid was collected from the lower reaction tube. From the observations and results obtained by means of these early tests just described, supra, it was determined that nitric oxide was indeed responsible for the oxidation of the hydrogen sulfide to elemental sulfur.

Through practice of the process taught and claimed in the instant invention, the conversion of $H_2S$ to elemental sulfur can be accomplished at a relatively high yield in but a single pass through the reactor. The oxidation of hydrogen sulfide to elemental sulfur by nitric oxide over a simple and relatively inexpensive catalyst is envisioned as having widespread applicability to sulfur gas removal systems in coal gasification and other facilities.

For the instant process to be highly applicable to the removal of sulfur gases in a coal gasification facility, it also must deal with the substantial amounts of carbonyl sulfide present. Thusly, it was also thought to be desirable to determine whether the carbonyl sulfide hydrolysis (equation 5, infra), shown by others (Laboratory for Adsorptiontechnik German Patent No. 1 667 590, 1971; Namba, S.; Shiba, T., *Kogyo Kagaku Zasshi* 1968, 71, 93-96; George, Z.M., *J. Catal.* 1974a, 261-271; George, Z. M., *J. Catal.* 1974b, 35, 218-224; Derdall, G.; Hyne, J. B., *Canad. J. Chem. Eng.* 1979, 57, 112-114) to occur either under acidic or basic conditions could be carried out at the same time and over the same catalyst as the hydrogen sulfide oxidation (equation 4, supra):

$$H_2O + COS \rightarrow CO_2 + H_2S \tag{5}$$

The water which would be necessary for the hydrolysis of the carbonyl sulfide to produce hydrogen sulfide and carbon dioxide would normally be present in the process gas streams, but for the purposes of testing the instant process it was supplied by flowing helium through a water-containing bubbler system held at a constant temperature.

From these investigations, it was found that the recovery of sulfur from the carbonyl sulfide/water/nitric oxide system is substantially temperature dependent and that consistently high yields of sulfur were obtained when the reactor was maintained at temperatures above about 350° C.

It is now abundantly clear from my findings, supra, that the simple mechanism of Pierce (Pierce, J.A., *J. Phys. Chem.* 1929, 33, 22–36) does not hold at temperatures above 100° C. However, because of my inability to observe the formation of additional hydrogen-containing materials and account for the stoichiometry of any other possible reactions I have discounted the occurrence of an alternative mechanism.

EXAMPLES

In order that those skilled in the art may better understand how the present invention can be practiced and more fully and definitely understood, the following examples are given by way of illustration and not necessarily by way of limitation. Reported herein are the results of my experiments with the silica gel-catalyzed reactions of gaseous $H_2S$ and NO. In addition, experiments in which COS was hydrolyzed in situ and its hydrolysis products reacted with NO also are reported.

In the conduct of various tests and investigations reported below, the following instruments were employed in order to confirm the identity of the products of these gas-phase reactions. Elemental analyses were performed using a Perkin-Elmer Model 240B elemental analyzer, and melting points were taken with an Electrothermal melting point apparatus. Gas chromatography/mass spectometry (GC/MS) analyses were carried out with a Perkin-Elmer Model 5980B spectrometer. NOTE: Any references made herein to materials and/or apparatus which are identified by means of trademarks, trade names, etc., are included solely for the convenience of the reader and are not intended as or to be construed an endorsement of said materials and/or apparatus. All gases were used as obtained commercially. The CO and NO (99.9%) were obtained from Company A. The COS (97.5%) and $H_2S$ (99.5%) were obtained from Company B. The details of Examples I–IX and results therefrom are listed after Example IX in Table I, infra. Likewise, various details and data obtained in the tests comprising Examples X–XXIX are listed at the end of Examples X–XXIX in Table II, infra.

EXAMPLE I

As discussed above, the initial thrust of my work was toward the development of a synthetic process for the production of thiourea from carbon monoxide, nitric oxide, and hydrogen sulfide. Thus, in this first test, 5 grams of (finely powdered, catalyst grade, high surface area) silica gel, as the catalyst, was charged and positioned by means of glass wool plugs in a quartz tube reactor some 3 cm in diameter and 60 cm in length and open at both ends and the system was brought to an operating temperature of about 200° C. Said quartz tube reactor was suspended within a standard configured Lindberg three-zone tube furnace sized to accommodate said 60 cm long tube. After the quartz tube reached a predetermined desired temperature of about 200° C., carbon monoxide at a flow rate of about 100 ml per minute, nitric oxide at a flow rate of about 200 ml per minute, and hydrogen sulfide at a flow rate of about 140 ml per minute were introduced into the upper end of the tube and over and in intimate contact with the silica gel catalyst for a period of about 5 hours (test 1, Table I, infra). The resulting yellow solid (0.95 g, melting point 119°–122° C.) which was collected from the trap and lower reaction tube was confirmed by subsequent X-ray analysis to be elemental sulfur.

COMPARATIVE EXAMPLE II AND III

In these Examples, no catalyst was employed tests in 2 and 3, and substantially the same equipment and procedures were utilized and followed as in Example I, supra; however, said tests 2 and 3 were conducted at 200° C. and 300° C., respectively. Traces of solid material were formed on the lower reaction tube; however, the amounts of material collected were insufficient for purposes of quantitative analysis and therefore could not be identified.

EXAMPLE IV

In this Example substantially the same equipment and procedures were utilized and followed as in Example I, supra; however, test 4 was performed in which the catalyst loading was increased to 10 grams. As noted, just supra, the temperature and gas flow rates were held at the levels used in test 1, Example I, supra. A substantial amount of yellow solid material, i.e., about 7.54 grams and having a melting point of 119°–122° C. was obtained from the trap and lower reaction tube and was later identified as elemental sulfur.

EXAMPLES V AND VI

In these Examples substantially the same equipment and procedures were utilized and followed as in Example I, supra; however, tests 5 and 6 were conducted for a period of about 6 hours each in order to help determine if either carbon monoxide, or nitric oxide, or both, are necessary to cause the oxidation of the hydrogen sulfide to elemental sulfur. In the first test, i.e., test 5, both carbon monoxide fed at a gas flow rate as in Example I, supra; i.e., of about 100 ml per minute, and hydrogen sulfide fed at a gas flow rate of about 140 ml per minute were passed over 10 grams of silica catalyst which was maintained at 200° C. No solid product was obtained in the trap or lower reaction tube. In the second test, i.e., test 6, nitric oxide fed at a gas flow rate of about 200 ml per minute, and hydrogen sulfide fed at a gas flow rate of about 200 ml per minute were passed over 10 grams of silica gel catalyst. About 1 gram of a yellow solid, melting point 119°–121° C., was collected from the lower reaction tube. Accordingly, it was concluded that nitric oxide was indeed responsible for the oxidation of the hydrogen sulfide to elemental sulfur.

EXAMPLES VII–IX

In these Examples substantially the same equipment and procedures were utilized and followed as in Example I, supra; however, tests 7–9 were conducted to determine if relatively higher conversion rates of, for example, $H_2S$ to elemental sulfur, than was previously experienced, as reported in the literature, could be obtained. As can be seen from data presented in Table I, infra, the conversion in tests 7-9 of $H_2S$ to elemental sulfur was accomplished at relatively high yield rates in but a single pass through the reactor containing the silica gel catalyst.

TABLE I

Experimental Conditions and Products From Reaction of Various Combinations of $H_2S$, CO, and NO Over Silica Gel Catalyst

| Test No. | Gas flow, ml/min CO | $H_2S$ | NO | Silica gel catalyst, g | Temp, °C. | Time, h | Residence Time, min[a] | Products Total wt, g | % S recovered[b] |
|---|---|---|---|---|---|---|---|---|---|
| 1 | 100 | 142 | 200 | 5 | 200 | 5 | .01 | 0.95 | 1.6 |
| 2 | 100 | 142 | 200 | 0 | 200 | 5 | 0 | — | — |
| 3 | 100 | 142 | 200 | 0 | 300 | 5 | 0 | — | — |
| 4 | 100 | 142 | 200 | 10 | 200 | 5 | .01 | 7.54 | 12.6 |
| 5 | 100 | 142 | — | 10 | 200 | 6 | .04 | — | — |
| 6 | — | 200 | 200 | 10 | 200 | 6 | .025 | 1 | — |
| 7 | — | 142 | 200 | 10 | 300 | 6 | .03 | 53.45 | 73 |
| 8 | — | 142 | 100 | 20 | 250 | 3 | .08 | 29.09 | 79 |
| 9 | — | 142 | 100 | 20 | 250 | 3 | .08 | 30.63 | 83 |

[a]Calculated per volume catalyst assuming 1 gm/cc.
[b]Calculated as % S recovered from total S feed.

EXAMPLES X-XXIX

In these Examples, additional experiments were performed to further and perhaps better determine the full economical and technical potential of the instant procedure and process. The results of these tests are summarized in Table II, infra, and graphically illustrated in FIGS. 2 and 3, supra, for the oxidation of hydrogen sulfide alone and for the two-step conversion of carbonyl sulfide, water, and nitric oxide to carbon dioxide and elemental sulfur, respectively.

Figure 1:
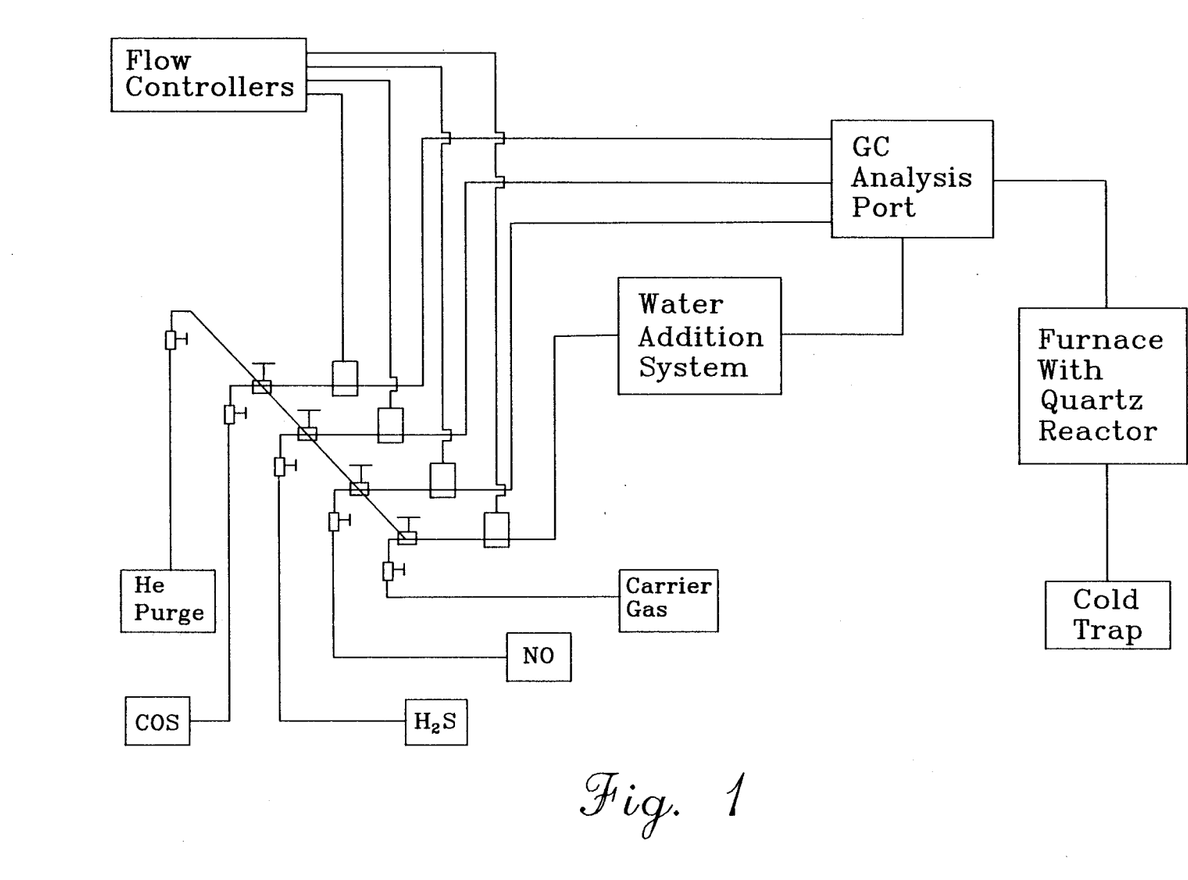
Figure 2:
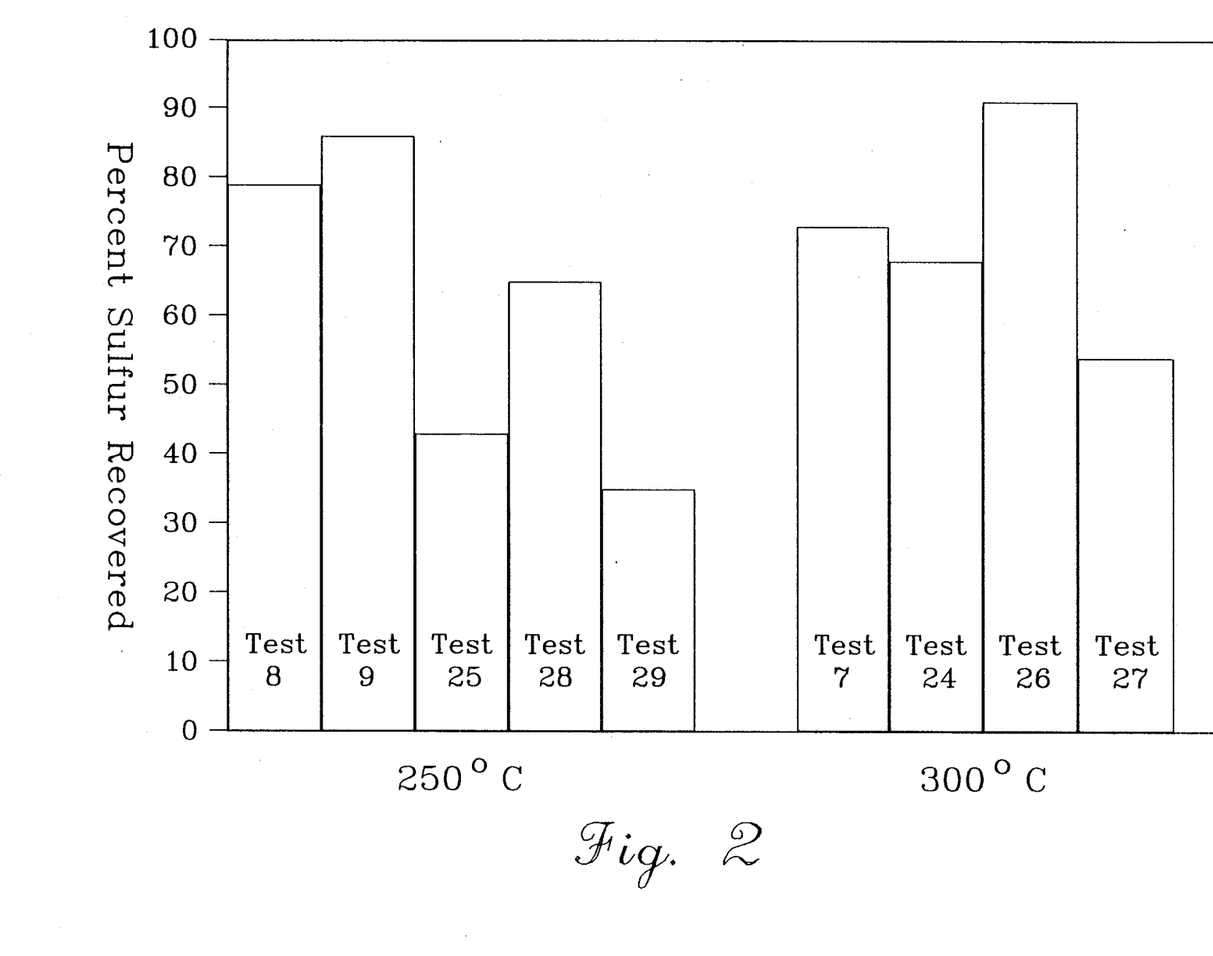
FIG. 2 represents a graphical illustration useful for comparing the yields of recovered sulfur from the oxidation of hydrogen sulfide with nitric oxide at temperatures of 300° C. and of 250° C.
Figure 3:
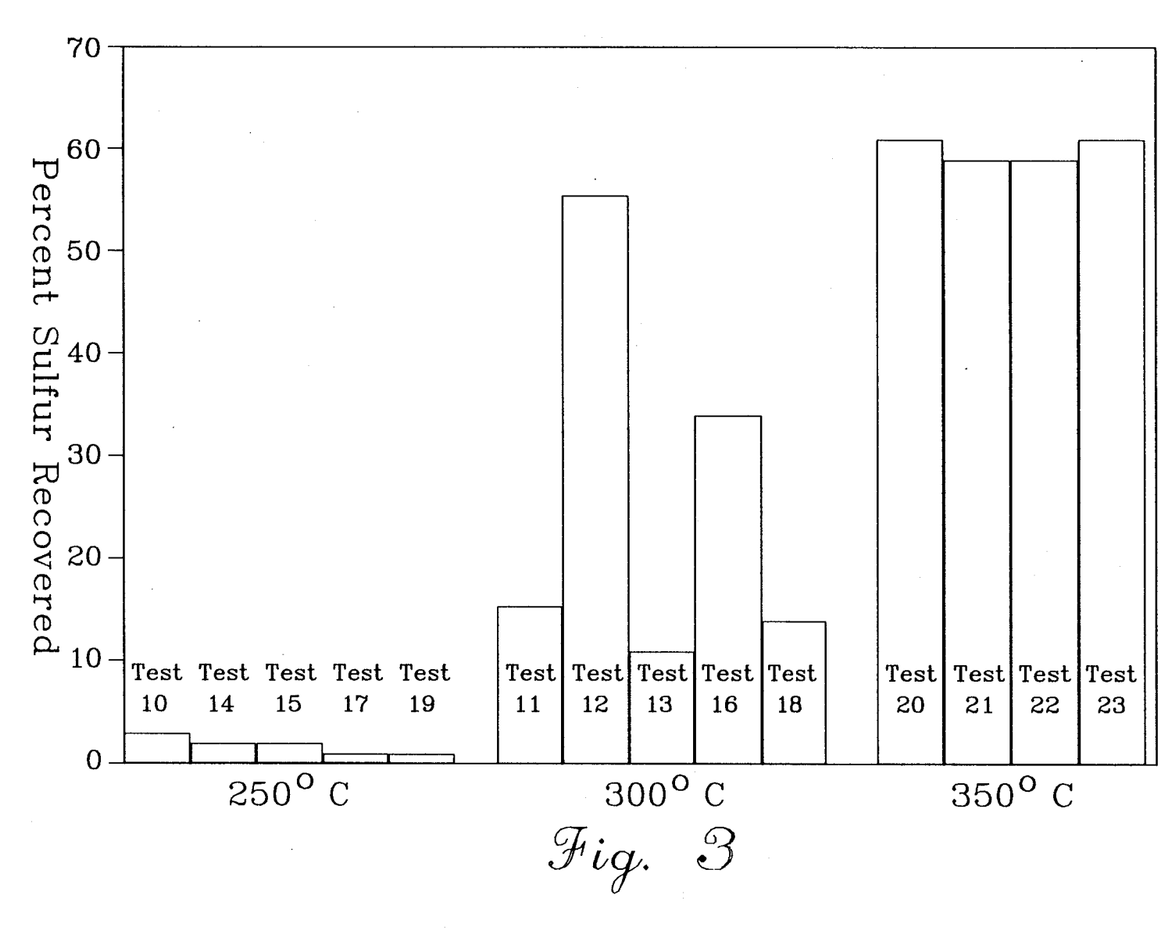
FIG. 3 represents a graphical illustration useful for comparing the yields of recovered sulfur from the combined process hydrolysis/oxidation of carbonyl sulfide with water and nitric acid at 250° C., 300° C., and 350° C.

A comparison of the information presented by FIGS. 2 and 3, supra, clearly indicates the greater dependence of the sulfur recovery from the carbonyl sulfide/water/nitric oxide system on temperature. As may be seen and appreciated by these depictions, consistently high yields of sulfur were not obtainable below temperature of about 350° C.

In test numbers 10-20, only small amounts of liquid products were collected. These products account for the reaction by-products anticipated from a hydrogen balance. Therefore, in test number 21, gas samples were collected and analyzed using GC/MS. The total ion chromatogram of one of these and the mass spectra of the individual peaks indicate the components were large amounts of $CO_2$ and COS, as well as small amounts of $N_2O$ and $CS_2$. No water or other hydrogen-containing materials were identified. Because of the small amount of $N_2O$ recovered, it is suggested that the hydrogen may be involved in a reactive unidentified $NO_xH$-type compound, which might condense on the glass walls of the sampling tube during the rather lengthy time between sampling and analysis, i.e., more than about two days.

It is apparent from the products obtained in the above examples that the simple mechanism of Pierce (Pierce, J. A., *J. Phys. Chem.* 1929 33, 22-36) is neither controlling, nor applicable at reaction temperatures above about 100° C. However, my inability to observe the formation of additional hydrogen-containing materials and account for the stoichiometry of the reactions is believed to preclude the suggestion of an alternative mechanism.

TABLE II

Experimental Conditions and Products From Reaction of COS or $H_2S$ With NO Over Silica Gel Catalyst in Presence of Water Vapor

| Test No. | Flow, ml/min NO | $H_2S$ | COS | Silica gel catalyst, g | He flow, ml/min | $H_2O$ bubbler | Temp, °C. Reaction tube | Time, h | Residence Time, min[a] | Products Total wt, g | % S recovered[b] |
|---|---|---|---|---|---|---|---|---|---|---|---|
| 10 | 100 | — | 200 | 20 | — | — | 250 | 3 | .06 | 1.22 | 3 |
| 11 | 200 | — | 200 | 20 | — | — | 300 | 3 | .05 | 8.04 | 15.4 |
| 12 | 50 | — | 100 | 20 | 100 | 60 | 300 | 3 | .08 | 14.16 | 55.5 |
| 13 | 50 | — | 100 | 20 | 100 | 60 | 300 | 3 | .08 | 2.88 | 11 |
| 14 | 50 | — | 100 | 20 | 100 | 60 | 250 | 3 | .08 | 0.51 | 2 |
| 15 | 50 | — | 100 | 20 | 100 | 60 | 250 | 3 | .08 | 0.50 | 2 |
| 16 | 50 | — | 100 | 20 | 50 | 60 | 300 | 3 | .1 | 9.90 | 34 |
| 17 | 50 | — | 100 | 20 | 50 | 60 | 250 | 3 | .1 | 0.18 | 0.5 |
| 18 | 50 | — | 100 | 20 | 150 | 60 | 300 | 3 | .06 | 3.57 | 14 |
| 19 | 50 | — | 100 | 20 | 150 | 60 | 250 | 3 | .06 | 0.65 | 1 |
| 20 | 50 | — | 100 | 20 | 100 | 60 | 350 | 3 | .08 | 15.67 | 61 |
| 21 | 50 | — | 100 | 20 | 50 | 60 | 350 | 3 | .1 | 15.09 | 59 |
| 22 | 50 | — | 100 | 20 | 150 | 60 | 350 | 3 | .06 | 15.18 | 59 |
| 23 | 50 | — | 100 | 20 | 150 | 60 | 350 | 3 | .06 | 15.86 | 61 |
| 24 | 50 | 71 | — | 20 | 100 | 60 | 300 | 3 | .09 | 12.46 | 68 |
| 25 | 50 | 71 | — | 20 | 100 | 60 | 250 | 3 | .09 | 8.10 | 43 |
| 26 | 50 | 71 | — | 20 | 100 | 60 | 300 | 3 | .09 | 16.70 | 91 |
| 27 | 50 | 71 | — | 20 | 150 | 60 | 300 | 3 | .074 | 10.06 | 54 |
| 28 | 50 | 71 | — | 20 | 100 | 60 | 250 | 3 | .074 | 11.82 | 65 |
| 29 | 50 | 71 | — | 20 | 150 | 60 | 250 | 3 | .074 | 6.35 | 35 |

[a]Calculated per volume of catalyst assuming 1 gm/cc.
[b]Calculated as % S recovered from total S feed.

INVENTION PARAMETERS

After sifting and winnowing through the data supra, as well as other results and operations of my new, novel, and improved technique, including methods and means for the effecting thereof, the operating variables, including the acceptable and preferred conditions for carrying out my invention are summarized in the table below.

| Parameter | Operating | Preferred | Most Preferred |
|---|---|---|---|
| Temperature °C. | 200–600 | 350–600 | 350 |
| Mole Ratio COS/$H_2O$ | 2:1–0.5:1 | 1:1–2:1 | 1:1 |
| Mole Ratio $H_2S$ + COS/NO | 0.5:1–2:1 | 1:1–2:1 | 1:1 |
| Residence Time in min (1 cc of gel ≃ 1 gm) | 0.01–1 | 0.01–0.5 | 0.01–0.1 |

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. A continuous method for removing COS and $H_2S$ from a gaseous mixture, said gaseous mixture including process or waste gas streams resulting from the combustion of fossil fuels, said method consisting essentially of:
   (a) mixing said gaseous mixture with water vapor at a mole ratio of COS: $H_2O$ ranging from about 2:1 to about 0.5:1 and with nitric oxide at a mole ratio of ($H_2S$+COS): NO ranging from about 2:1 to about 0.5:1
   (b) heating the mixture resulting from the mixing in step (a), supra, to temperatures ranging from about 350° C. to about 600° C.;
   (c) passing the resulting heated mixture from step (b), supra, into intimate contact with catalyst means, said catalyst means comprising silica gel;
   (d) maintaining said intimate contact established in step (c), supra, for a period of time ranging from about 0.01 minutes to about 1 minute whereby substantially the sulfur-containing gases contained in said gaseous mixture are converted to elemental sulfur; and
   (e) thereafter removing from step (d), supra, at least a portion of the resulting sulfur-rich stream for recovery of the sulfur vapor values therein;

said process characterized by the fact that sulfur-containing pollutants comprising COS and $H_2S$ contained in said gas streams resulting from the combustion of high-sulfur content fossil fuel can effectively and efficiently be removed therefrom without the requirement to substantially adjust or change the enthalpy of such gas streams.

2. The method of claim 1, wherein the mole ratio of COS: $H_2O$ is maintained at about 1:1.

3. The method of claim 1, wherein the mole ratio of (COS+$H_2S$): NO is maintained at about 1:1.

4. The method of claim 1, wherein said silica gel catalyst is a high-surface area silica gel.

5. The method of claim 1, wherein step (a) thereof at least portions of the NO and the water vapor are congeneric with said gaseous mixture.

6. The method of claim 5, wherein portions of NO or water vapor or both are added to said gaseous mixture to adjust the stoichiometry so as to maintain said mole ratios, COS: $H_2O$ and ($H_2S$+COS):NO, in the range of from about 2:1 to about 0.5:1.

* * * * *